US012637840B2

(12) United States Patent
Matsumoto et al.

(10) Patent No.: US 12,637,840 B2
(45) Date of Patent: May 26, 2026

(54) WORK MACHINE SURROUNDINGS MONITORING SYSTEM, WORK MACHINE, AND WORK MACHINE SURROUNDINGS MONITORING METHOD

(71) Applicant: Komatsu Ltd., Tokyo (JP)

(72) Inventors: Hirosuke Matsumoto, Tokyo (JP); Shun Yasaku, Tokyo (JP)

(73) Assignee: KOMATSU LTD., Tokyo (JP)

( * ) Notice: Subject to any disclaimer, the term of this patent is extended or adjusted under 35 U.S.C. 154(b) by 392 days.

(21) Appl. No.: 18/269,578

(22) PCT Filed: Jan. 31, 2022

(86) PCT No.: PCT/JP2022/003562
§ 371 (c)(1),
(2) Date: Jun. 26, 2023

(87) PCT Pub. No.: WO2022/176586
PCT Pub. Date: Aug. 25, 2022

(65) Prior Publication Data
US 2024/0052602 A1 Feb. 15, 2024

(30) Foreign Application Priority Data
Feb. 19, 2021 (JP) ................................. 2021-025413

(51) Int. Cl.
*E02F 9/26* (2006.01)
*E02F 3/76* (2006.01)
(Continued)

(52) U.S. Cl.
CPC ........... *E02F 9/261* (2013.01); *H04N 5/2624* (2013.01); *H04N 23/90* (2023.01); *E02F 3/7636* (2013.01)

(58) Field of Classification Search
CPC ...................... E02F 9/261; E02F 3/7636–7695
(Continued)

(56) References Cited

U.S. PATENT DOCUMENTS

| | | | |
|---|---|---|---|
| 9,457,719 B2 | 10/2016 | Tanuki et al. | |
| 10,421,400 B2 | 9/2019 | Imaizumi et al. | |
(Continued)

FOREIGN PATENT DOCUMENTS

| | | | |
|---|---|---|---|
| CN | 103828351 A | 5/2014 | |
| CN | 107431789 A | 12/2017 | |
(Continued)

*Primary Examiner* — Tara Mayo
(74) *Attorney, Agent, or Firm* — Troutman Pepper Locke LLP; James E. Armstrong, IV; Joshua L. Jones

(57) ABSTRACT

A work machine surroundings monitoring system includes a first display image generation unit that generates a first display image indicating surroundings of a work machine on the basis of a camera image of a camera that captures an image of the surroundings of the work machine, a second display image generation unit that generates a second display image in a display mode different from that of the first display image on the basis of camera images of a plurality of cameras that capture images of the surroundings of the work machine, and a display control unit that generates a signal for displaying the first display image on a part of a display screen, displaying the second display image on a part of the display screen, and displaying a boundary image at a boundary between the first display image and the second display image on the display screen.

17 Claims, 12 Drawing Sheets

(51) Int. Cl.
　　*H04N 5/262*　　　(2006.01)
　　*H04N 23/90*　　　(2023.01)
(58) Field of Classification Search
　　USPC .................................................. 172/781–799
　　See application file for complete search history.

(56) References Cited

U.S. PATENT DOCUMENTS

| | | |
|---|---|---|
| 10,920,403 B2 | 2/2021 | Izumikawa |
| 2013/0182066 A1 | 7/2013 | Ishimoto |
| 2014/0088824 A1 | 3/2014 | Shimoto |
| 2015/0217691 A1 | 8/2015 | Tanuki et al. |
| 2018/0027179 A1 | 1/2018 | Matsuzaki et al. |
| 2018/0222390 A1 | 8/2018 | Imaizumi et al. |
| 2019/0078292 A1 | 3/2019 | Takeichi |
| 2019/0093317 A1 | 3/2019 | Izumikawa |
| 2021/0287335 A1 | 9/2021 | Goto et al. |

FOREIGN PATENT DOCUMENTS

| | | |
|---|---|---|
| JP | 2012-074929 A | 4/2012 |
| JP | 5066198 B2 | 11/2012 |
| JP | 2014064192 A | 4/2014 |
| JP | 5779244 B2 | 9/2015 |
| JP | 2018-044328 A | 3/2018 |
| JP | 6597518 B2 | 10/2019 |
| JP | 6727971 B2 | 7/2020 |
| JP | 2020145581 A | 9/2020 |
| WO | 2017/131243 A1 | 8/2017 |
| WO | 2017/163823 A1 | 9/2017 |
| WO | 2018008542 A1 | 1/2018 |

+Z(UP)

-X(LEFT) ←→ +X(RIGHT)

-Z(DOWN)

CI

IM1

FI1

SI

BI

IM2

+Z(UP)

-X(LEFT) ←→ +X(RIGHT)

-Z(DOWN)

CI

IM1

FI1

SI

BI

IM2

FI2

+Z(UP)

-X(LEFT) ←→ +X(RIGHT)

-Z(DOWN)

WORK MACHINE SURROUNDINGS MONITORING SYSTEM, WORK MACHINE, AND WORK MACHINE SURROUNDINGS MONITORING METHOD

FIELD

The present disclosure relates to a work machine surroundings monitoring system, a work machine, and a work machine surroundings monitoring method.

BACKGROUND

In a technical field related to a work machine, a surroundings monitoring device as disclosed in Patent Literature 1 is known.

CITATION LIST

Patent Literature

Patent Literature 1: JP 2012-074929 A

SUMMARY

Technical Problem

A surroundings monitoring device includes a display unit that displays an image around a work machine. A driver of the work machine can recognize a situation around the work machine by checking the image displayed on the display unit. There is a case where it is desired to display a plurality of types of images on the display unit in order to cause the driver to highly recognize the situation around the work machine. On the other hand, when the plurality of types of images are simultaneously displayed on the display unit, visibility may deteriorate.

An object of the present disclosure is to suppress the deterioration in visibility in a case where the plurality of types of images are simultaneously displayed on the display unit.

Solution to Problem

According to an aspect of the present invention, a work machine surroundings monitoring system comprises: a first display image generation unit that generates a first display image indicating surroundings of a work machine on the basis of a camera image of a camera that captures an image of the surroundings of the work machine; a second display image generation unit that generates a second display image in a display mode different from that of the first display image on the basis of camera images of a plurality of cameras that capture images of the surroundings of the work machine; and a display control unit that generates a signal for displaying the first display image on a part of a display screen, displaying the second display image on a part of the display screen, and displaying a boundary image at a boundary between the first display image and the second display image on the display screen.

Advantageous Effects of Invention

According to the present disclosure, deterioration in visibility is suppressed in a case where a plurality of types of images are simultaneously displayed on a display unit.

DESCRIPTION OF EMBODIMENTS

Embodiments according to the present disclosure will be described with reference to the drawings, but the present disclosure is not limited to those embodiments. The components of the embodiments described below can be appropriately combined. In addition, some components may not be used.

In the embodiments, a local coordinate system is set in a work machine 1, and a positional relationship of each unit will be described with reference to the local coordinate system. In the local coordinate system, a first axis extending in a left-right direction (vehicle width direction) of the work machine 1 is defined as an X axis, a second axis extending in a front-rear direction of the work machine 1 is defined as a Y axis, and a third axis extending in an up-down direction of the work machine 1 is defined as a Z axis. The X axis and the Y axis are orthogonal to each other. The Y axis and the Z axis are orthogonal to each other. The Z axis and the X axis are orthogonal to each other. The +X direction is a right direction, and the −X direction is a left direction. The +Y direction is a forward direction, and the −Y direction is a backward direction. The +Z direction is an upward direction, and the −Z direction is a downward direction.

First Embodiment

<Work Machine>

Figure 1:
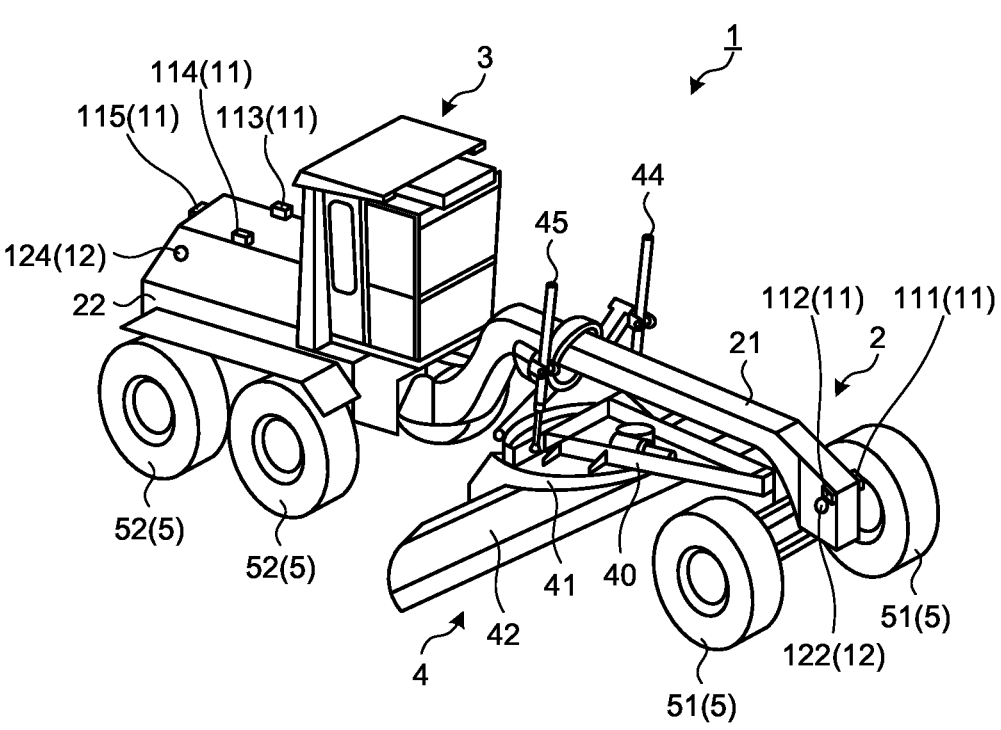
FIG. 1 is a perspective view illustrating a work machine according to an embodiment.
Figure 1:
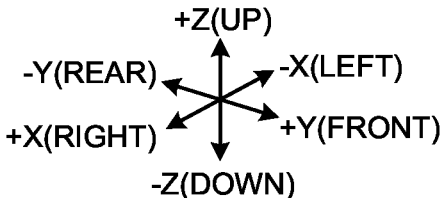
Figure 2:
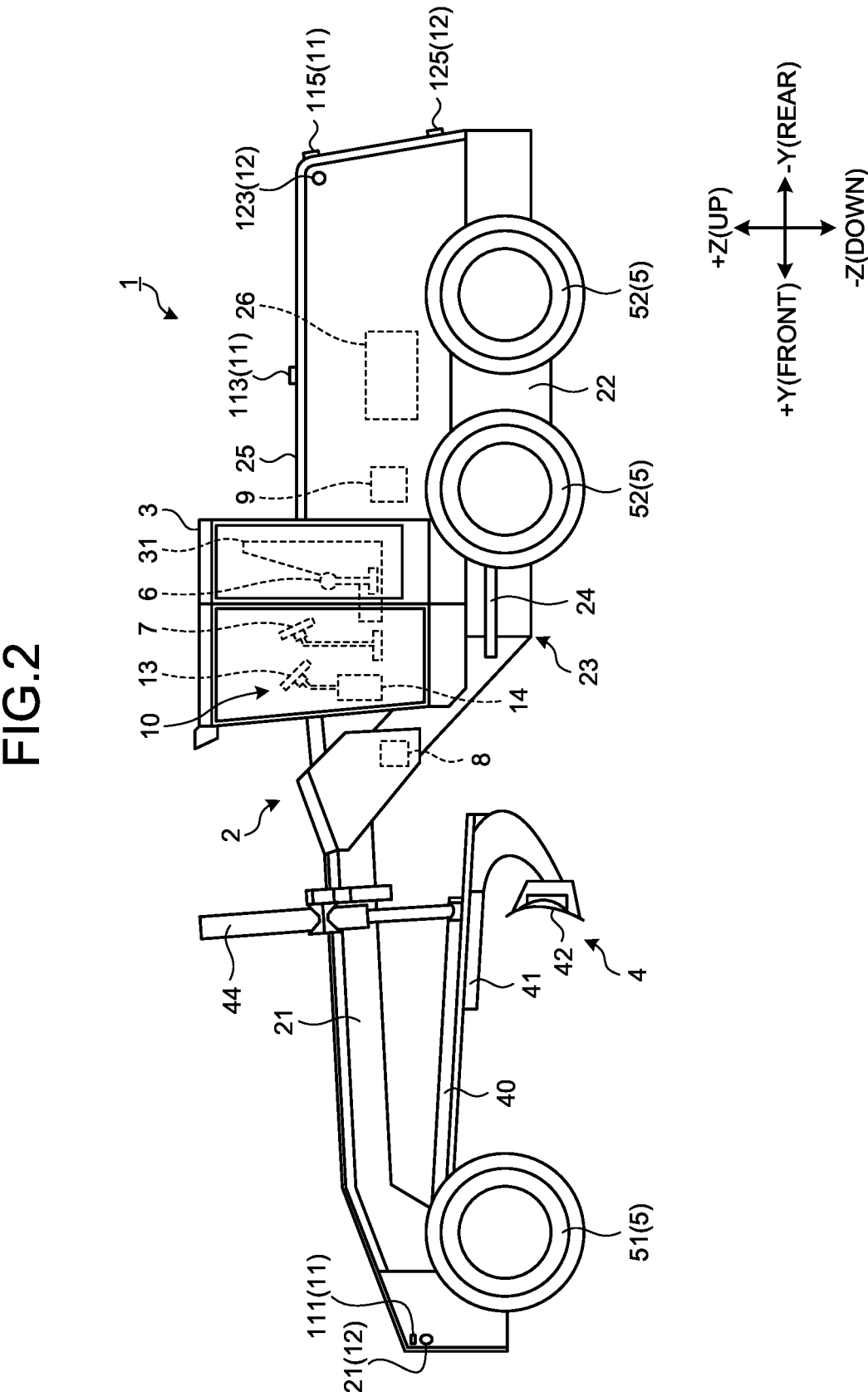
FIG. 2 is a side view illustrating the work machine according to the embodiment.

FIG. 1 is a perspective view illustrating the work machine 1 according to an embodiment. FIG. 2 is a side view illustrating the work machine 1 according to the embodiment. In the embodiment, the work machine 1 is assumed to be a motor grader. In the following description, the work machine 1 is appropriately referred to as a motor grader 1.

As illustrated in FIGS. 1 and 2, the motor grader 1 includes a vehicle body 2, a cab 3, a working equipment 4, wheels 5, a working equipment operation device 6, a travel operation device 7, a working equipment control device 8, a travel control device 9, and a surroundings monitoring system 10.

The motor grader 1 travels through a work site by the wheels 5. The motor grader 1 performs work using the working equipment 4 at the work site. The working equipment 4 performs work at the work site. Examples of the work performed by the motor grader 1 include ground leveling work, road planing work, excavation work, snow removal work, and material mixing work.

The vehicle body 2 supports the working equipment 4. The vehicle body 2 includes a front vehicle body 21 and a rear vehicle body 22. The front vehicle body 21 is disposed in front of the rear vehicle body 22. The front vehicle body 21 and the rear vehicle body 22 are connected by an articulate mechanism 23. The front vehicle body 21 is pivotably connected to the rear vehicle body 22 via the articulate mechanism 23. A rear end portion of the front vehicle body 21 and a front end portion of the rear vehicle body 22 are connected via the articulate mechanism 23. The articulate mechanism 23 includes a center pin extending in a Z-axis direction. The rear end portion of the front vehicle body 21 and a rear end portion of the rear vehicle body 22 are connected via the center pin.

The articulate mechanism 23 includes an articulate cylinder 24. The articulate cylinder 24 connects the front vehicle body 21 and the rear vehicle body 22. When the articulate cylinder 24 expands and contracts, the front vehicle body 21 is bent in the left-right direction with respect to the rear vehicle body 22. When the front vehicle body 21 is bent with respect to the rear vehicle body 22, the traveling direction of the motor grader 1 is adjusted. The articulate cylinder 24 is, for example, a hydraulic cylinder.

The rear vehicle body 22 includes an exterior cover 25. An engine room is formed inside the exterior cover 25. An engine 26 is disposed in the engine room. The rear vehicle body 22 supports the engine 26.

The cab 3 is supported by the rear vehicle body 22. A driver boards inside the cab 3. A seat 31 on which the driver sits is disposed inside the cab 3.

The working equipment 4 is supported by the front vehicle body 21. The working equipment 4 includes a drawbar 40, a swing circle 41, a blade 42. The drawbar 40 is disposed below the front vehicle body 21. A front end portion of the drawbar 40 is connected to a front end portion of the front vehicle body 21 via a ball shaft portion. The front end portion of the drawbar 40 is swingably supported by the front end portion of the front vehicle body 21. A rear end portion of the drawbar 40 is supported by the front vehicle body 21 via a lift cylinder 44 and a lift cylinder 45. The drawbar 40 is suspended from the front vehicle body 21 via the lift cylinder 44 and the lift cylinder 45.

The swing circle 41 is disposed below the front vehicle body 21. The swing circle 41 is disposed below the drawbar 40. The swing circle 41 is swingably supported by the rear end portion of the drawbar 40.

The blade 42 is disposed between the front end portion of the vehicle body 2 and the rear end portion of the vehicle body 2. The blade 42 is supported by the swing circle 41. The blade 42 is supported by the drawbar 40 via the swing circle 41. The blade 42 is supported by the front vehicle body 21 via the drawbar 40. When the swing circle 41 swings, a propulsion angle of the blade 42 is adjusted. The propulsive angle of the blade 42 refers to an inclination angle of the blade 42 with respect to the Y axis.

The lift cylinder 44 and the lift cylinder 45 support the drawbar 40. The lift cylinder 44 and the lift cylinder 45 support the blade 42 via the drawbar 40. When the lift cylinder 44 and the lift cylinder 45 expand and contract, the rear end portion of the drawbar 40 moves in the up-down direction with respect to the front vehicle body 21. That is, heights of the drawbar 40 and the blade 42 are adjusted by expansion and contraction of the lift cylinder 44 and the lift cylinder 45. In addition, the drawbar 40 swings in a rotary direction around the Y axis as the lift cylinder 44 and the lift cylinder 45 expand and contract by different expansion and contraction amounts. The blade 42 is movable in each of the Z-axis direction and the rotary direction around the Y-axis.

The wheels 5 support the vehicle body 2. The wheels 5 include front wheels 51 and rear wheels 52. The front wheels 51 are disposed in front of the rear wheels 52. In the front-rear direction, the blade 42 is disposed between the front wheels 51 and the rear wheels 52. The front wheels 51 are disposed in front of the blade 42. The rear wheels 52 are disposed behind the blade 42.

The front wheels 51 are attached to the front vehicle body 21. The front vehicle body 21 rotatably supports the front wheels 51. The front wheels 51 are supported by the front end portion of the front vehicle body 21. One front wheel 51 is disposed on the left side of the front vehicle body 21 and one front wheel is disposed on the right side of the front vehicle body 21. That is, two front wheels 51 are provided.

The rear wheels 52 are attached to the rear vehicle body 22. The rear vehicle body 22 rotatably supports the rear wheels 52. Two rear wheels 52 are disposed on the left side of the rear vehicle body 22, and two rear wheels 52 are disposed on the right side of the rear vehicle body 22. That is, four rear wheels 52 are provided. The rear wheels 52 rotate based on power generated by the engine 26.

In the embodiment, the X axis is parallel to a rotation shaft of the front wheel 51. The Z axis is orthogonal to the ground contact surface of the front wheel 51 in contact with the ground. When the motor grader 1 travels straight, the rotation shaft of the front wheel 51 and the rotation shaft of the rear wheel 52 are parallel to each other.

Each of the working equipment operation device 6 and the travel operation device 7 is disposed inside the cab 4. Each of the working equipment operation device 6 and the travel operation device 7 is operated by the driver.

The working equipment operation device 6 generates an operation signal for operating the working equipment 4. A working equipment operation lever is exemplified as the working equipment operation device 6. When the working equipment operation device 6 is operated by the driver, the working equipment operation device 6 generates the operation signal. The operation signal of the working equipment operation device 6 is transmitted to the working equipment control device 8. The working equipment control device 8 outputs a control command for operating the working equipment 4 based on the operation signal of the working equipment operation device 6. The control command output from the working equipment control device 8 includes a control command for operating at least one of the lift cylinder 44 and the lift cylinder 45. The blade 42 of the working equipment 4 moves in at least one of the Z-axis direction and the rotary direction around the Y-axis based on the control command output from the working equipment control device 8.

The travel operation device 7 generates an operation signal for driving, braking, and swinging the motor grader 1. Examples of the travel operation device 7 include a steering wheel, a shift lever, an accelerator pedal, a brake pedal, and an inching pedal. When the travel operation device 7 is operated by the driver, the travel operation device 7 generates the operation signal. The operation signal of the travel operation device 7 is transmitted to the travel control device 9. The travel control device 9 outputs a control command for driving, braking, and swinging the motor grader 1 based on the operation signal of the travel operation device 7. The control command output from the travel control device 9 to drive the motor grader 1 includes a control command for increasing the power of the engine 26. The control command output from the travel control device 9 to brake the motor grader 1 includes a control command to operate a brake device (not illustrated). The control command output from the travel control device 9 to swing the motor grader 1 includes a control command for operating the articulate cylinder 24. The motor grader 1 executes at least one of driving, braking, and swinging based on the control command output from the travel control device 9.

<Surroundings Monitoring System>

A surroundings monitoring system 10 monitors surroundings of the motor grader 1. The surroundings monitoring system 10 includes a camera system 11, a radar system 12, a surroundings monitoring monitor 13, and a monitor control device 14.

The camera system 11 includes a plurality of cameras. The camera includes an optical system and an image sensor. Examples of the image sensor include a couple charged device (CCD) image sensor and a complementary metal oxide semiconductor (CMOS) image sensor. The camera is provided in the vehicle body 2 of the motor grader 1. The camera captures an image of the surroundings of the motor grader 1 and acquires the image of the surroundings of the motor grader 1. The camera captures an image of at least surroundings of the vehicle body 2. In the following description, the image acquired by the camera of the camera system 11 is appropriately referred to as a camera image.

The radar system 12 includes a plurality of radars. The radar is provided in the vehicle body 2 of the motor grader 1. The radar detects an obstacle around the motor grader 1 in a non-contact manner.

Figure 3:
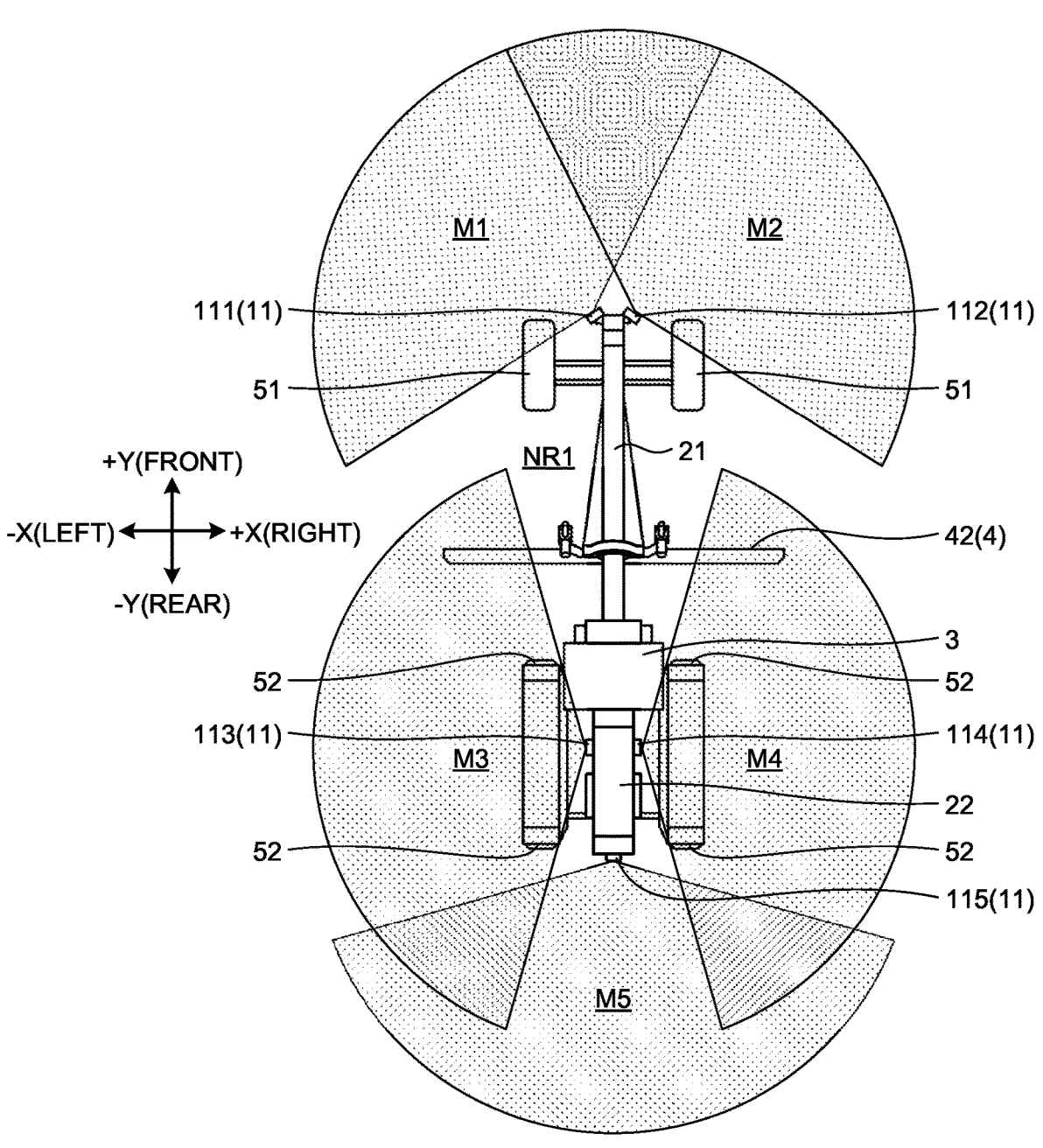
FIG. 3 is a top view schematically illustrating a camera system according to the embodiment.

FIG. 3 is a top view schematically illustrating the camera system 11 according to the embodiment. As illustrated in FIGS. 1, 2, and 3, the camera system 11 includes a first camera 111 provided in the front vehicle body 21, a second camera 112 provided in the front vehicle body 21, a third camera 113 provided in the rear vehicle body 22, a fourth camera 114 provided in the rear vehicle body 22, and a fifth camera 115 provided in the rear vehicle body 22. The first camera 111 and the second camera 112 capture an image of the front of the front vehicle body 21. The third camera 113, the fourth camera 114, and the fifth camera 115 capture an image of the rear of the rear vehicle body 22.

The first camera 111 is provided on a left portion of the front end portion of the front vehicle body 21. The first camera 111 captures an image of the left front of the front vehicle body 21. An imaging range M1 of the first camera 111 is defined in the left front of the front vehicle body 21.

The second camera 112 is provided in a right portion of the front end portion of the front vehicle body 21. The second camera 112 captures an image of the right front of the front vehicle body 21. An imaging range M2 of the second camera 112 is defined in the right front of the front vehicle body 21.

The third camera 113 is provided in a left portion of the rear vehicle body 22. The third camera 113 captures an image of the left of the rear vehicle body 22. An imaging range M3 of the third camera 113 is defined in the left of the rear vehicle body 22.

The fourth camera 114 is provided in a right portion of the rear vehicle body 22. The fourth camera 114 captures an image of the right of the rear vehicle body 22. An imaging range M4 of the fourth camera 114 is defined in the right of the rear vehicle body 22.

The fifth camera 115 is provided in the rear end portion of the rear vehicle body 22. The fifth camera 115 captures an image of the rear of the rear vehicle body 22. An imaging range M5 of the fifth camera 115 is defined in the rear of the rear vehicle body 22.

The imaging range M1 and at least a part of the imaging range M2 overlap. The imaging range M3 and at least a part of the imaging range M5 overlap. The imaging range M4 and at least a part of the imaging range M5 overlap.

A non-imaging range NR1 in which an image is not captured by the camera system 11 is provided around the cab 3. The non-imaging range NR1 is defined in each of the left front of the cab 3 and the right front of the cab 3.

Figure 4:
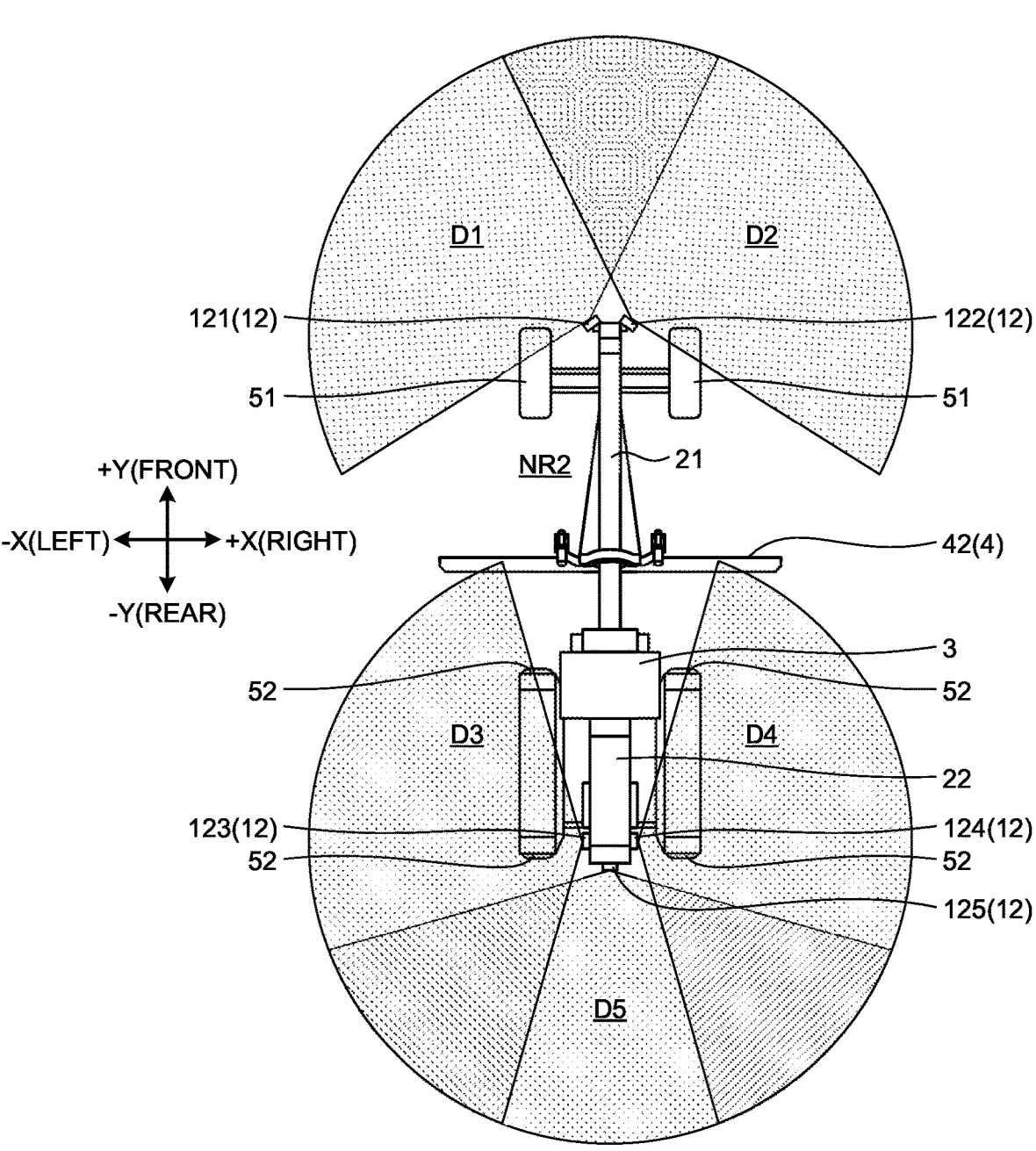
FIG. 4 is a top view schematically illustrating a radar system according to the embodiment.

FIG. 4 is a top view schematically illustrating the radar system 12 according to the embodiment. As illustrated in FIGS. 1, 2, and 4, the radar system 12 includes a first radar 121 provided in the front vehicle body 21, a second radar 122 provided in the front vehicle body 21, a third radar 123 provided in the rear vehicle body 22, a fourth radar 124 provided in the rear vehicle body 22, and a fifth radar 125 provided in the rear vehicle body 22.

The first radar 121 is provided in the left portion of the front end portion of the front vehicle body 21. The first radar 121 detects the left front of the front vehicle body 21. A detection range D1 of the first radar 121 is defined in the left front of the front vehicle body 21.

The second radar 122 is provided in the right portion of the front end portion of the front vehicle body 21. The second radar 122 detects the right front of the front vehicle body 21. A detection range D2 of the second radar 122 is defined in the right front of the front vehicle body 21.

The third radar 123 is provided in the left portion of the rear vehicle body 22. The third radar 123 detects the left of the rear vehicle body 22. A detection range D3 of the third radar 123 is defined in the left of the rear vehicle body 22.

The fourth radar 124 is provided in the right portion of the rear vehicle body 22. The fourth radar 124 detects the right of the rear vehicle body 22. A detection range D4 of the fourth radar 124 is defined in the right of the rear vehicle body 22.

The fifth radar 125 is provided in the rear end portion of the rear vehicle body 22. The fifth radar 125 detects the rear of the rear vehicle body 22. A detection range D5 of the fifth radar 125 is defined in the rear of the rear vehicle body 22.

The detection range D1 and at least a part of the detection range D2 overlap. The detection range D3 and at least a part of the detection range D5 overlap. The detection range D4 and at least a part of the detection range D5 overlap.

A non-detection range NR2 that is not detected by the radar system 12 is provided around the cab 3. The non-detection range NR2 is defined in each of the left front of the cab 3 and the right front of the cab 3.

Figure 5:
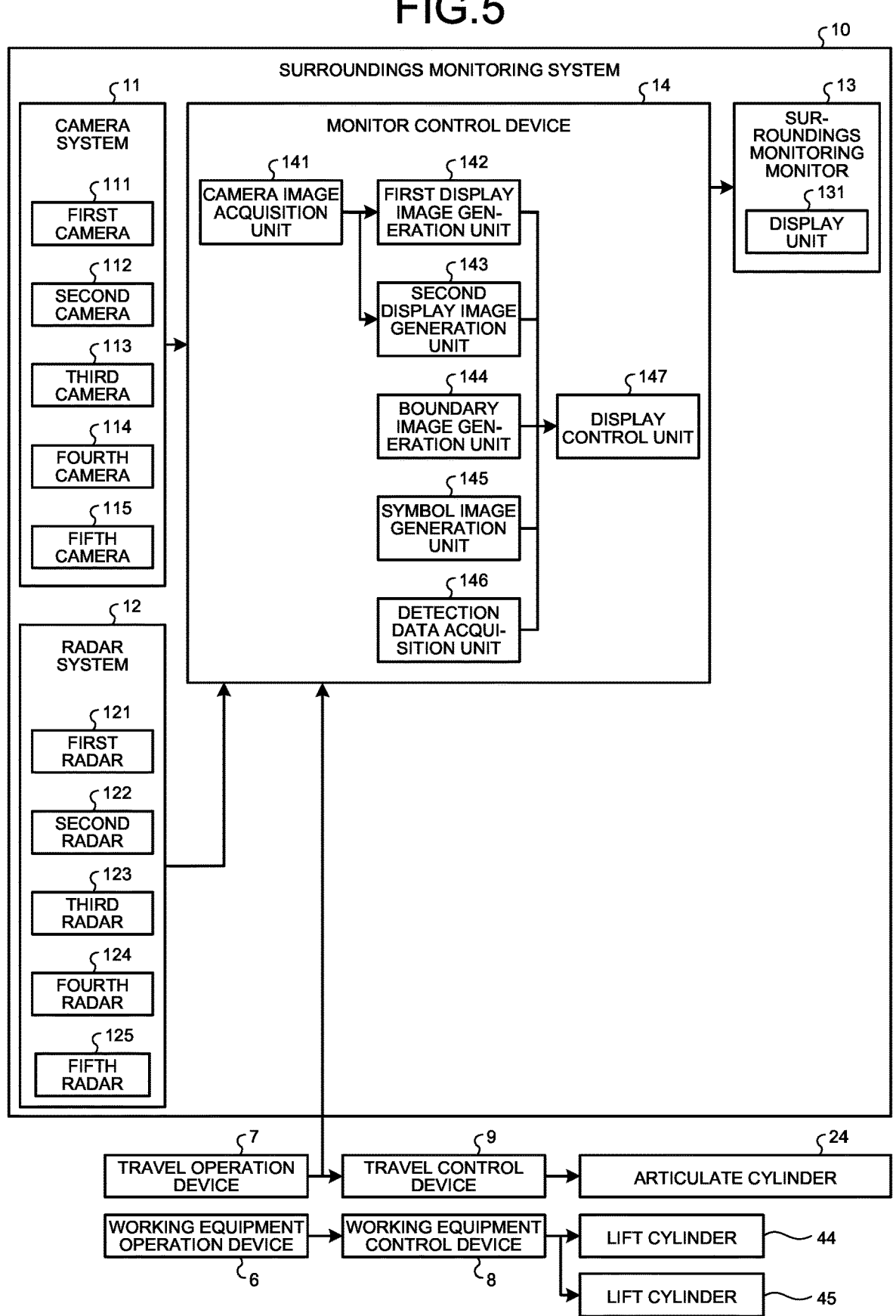
FIG. 5 is a functional block diagram illustrating a motor grader according to the embodiment.

FIG. 5 is a functional block diagram illustrating the motor grader 1 according to the embodiment. The surroundings monitoring system 10 includes a camera system 11, a radar system 12, a surroundings monitoring monitor 13, and a monitor control device 14.

The monitor control device 14 includes a computer system. The monitor control device 14 includes a camera image acquisition unit 141, a first display image generation unit 142, a second display image generation unit 143, a boundary image generation unit 144, a symbol image generation unit 145, a detection data acquisition unit 146, and a display control unit 147. Note that the monitor control device 14 may include a single computer system, or a plurality of computer systems may function as the monitor control device 14 in cooperation with each other.

The camera image acquisition unit 141 acquires a camera image from the camera system 11. The camera image acquisition unit 141 acquires a first camera image indicating a situation in the left front of the front vehicle body 21 from the first camera 111. The camera image acquisition unit 141 acquires a second camera image indicating a situation in the right front of the front vehicle body 21 from the second camera 112. The camera image acquisition unit 141 acquires a third camera image indicating a situation in the left of the rear vehicle body 22 from the third camera 113. The camera image acquisition unit 141 acquires a fourth camera image indicating a situation in the right of the rear vehicle body 22 from the fourth camera 114. The camera image acquisition unit 141 acquires a fifth camera image indicating a situation in the rear of the rear vehicle body 22 from the fifth camera 115.

The first display image generation unit 142 generates a first display image IM1 indicating a first portion around the motor grader 1 on the basis of the first camera image around the motor grader 1 captured by the first camera 111 and the second camera image around the motor grader 1 captured by the second camera 112. In the embodiment, the first display image IM1 includes a front portion around the motor grader 1. The first display image IM1 includes the surroundings of the front vehicle body 21.

The first display image IM1 is a first viewpoint image viewed from a first viewpoint different from a position of the first camera 111 and a position of the second camera 112. In the embodiment, the first display image generation unit 142 generates a panoramic image indicating the surroundings of the front vehicle body 21 on the basis of the first camera image and the second camera image.

The panoramic image refers to an image generated by synthesizing a plurality of camera images acquired by each of the plurality of cameras with images in a plurality of line-of-sight directions having a reference viewpoint related to the generation of the panoramic image as a viewpoint position. For example, the panoramic image of the entire circumference is an image in which images corresponding to the plurality of line-of-sight directions in a range of 0° to +180° and a range of 0° to −180° around the reference viewpoint are continuously connected. In the case of the panoramic image of the entire circumference, an image in any line-of-sight direction in a range of 360° is obtained. Note that the panoramic image may not correspond to the entire circumference. For example, an image (180° panoramic image) corresponding to a line-of-sight direction in a range of 0° to +90° and a range of 0° to −90° may be used. Furthermore, the panoramic image may be an image in which images corresponding to the plurality of line-of-sight directions obtained by rotating the line-of-sight direction in the horizontal direction are continuous, or may be an image in which images corresponding to the plurality of line-of-sight directions obtained by rotating the line-of-sight direction in the vertical direction are continuous. Furthermore, the panoramic image may be an image in which images corresponding to the plurality of line-of-sight directions obtained by three-dimensionally changing the line-of-sight direction are continuous, such as a spherical image.

In the embodiment, the panoramic image is generated so as to connect the right end portion of the first camera image and the left end portion of the second camera image.

In the following description, the first display image IM1 is appropriately referred to as a panoramic image IM1.

The second display image generation unit 143 generates a second display image IM2 indicating a second portion around the motor grader 1 on the basis of the third camera image around the motor grader 1 captured by the third camera 113, the fourth camera image around the motor grader 1 captured by the fourth camera 114, and the fifth camera image around the motor grader 1 captured by the fifth camera 115. In the embodiment, the second display image IM2 includes a rear portion around the motor grader 1. The second display image IM2 includes the surroundings of the rear vehicle body 22.

The second display image IM2 is a second viewpoint image viewed from a second viewpoint different from a position of the third camera 113, a position of the fourth camera 114, and a position of the fifth camera 115. In the embodiment, the second display image generation unit 143 generates a bird's eye image indicating the surroundings of the rear vehicle body 22 on the basis of the third camera image, the fourth camera image, and the fifth camera image.

The bird's eye image refers to an image generated by converting the plurality of camera images acquired by each of the plurality of cameras into an upper viewpoint related to the generation of the bird's eye image and synthesizing the images.

The second display image IM2 is an image in a display mode different from that of the first display image IM1. For example, the second display image IM2 is an image viewed from a viewpoint different from that of the first display image IM1.

In the following description, the second display image IM2 is appropriately referred to as a bird's eye image IM2.

The boundary image generation unit 144 generates a boundary image BI disposed between the panoramic image IM1 and the bird's eye image IM2.

The boundary image BI refers to an image displayed at the boundary between the panoramic image IM1 and the bird's eye image IM2 in order to clarify the distinction between panoramic image IM1 and the bird's eye image IM2.

The symbol image generation unit 145 generates a symbol image SI indicating the motor grader 1. In the embodiment, the symbol image generation unit 145 changes the symbol image SI on the basis of the operation signal from the travel operation device 7.

The symbol image SI is an image that simulates the motor grader 1 viewed from above.

The detection data acquisition unit 146 acquires detection data of the radar from the radar system 12.

The display control unit 147 displays the panoramic image IM1, the bird's eye image IM2, the boundary image BI, and the symbol image SI on the display screen of the surroundings monitoring monitor 13.

<Surroundings Monitoring Monitor>

Figure 6:
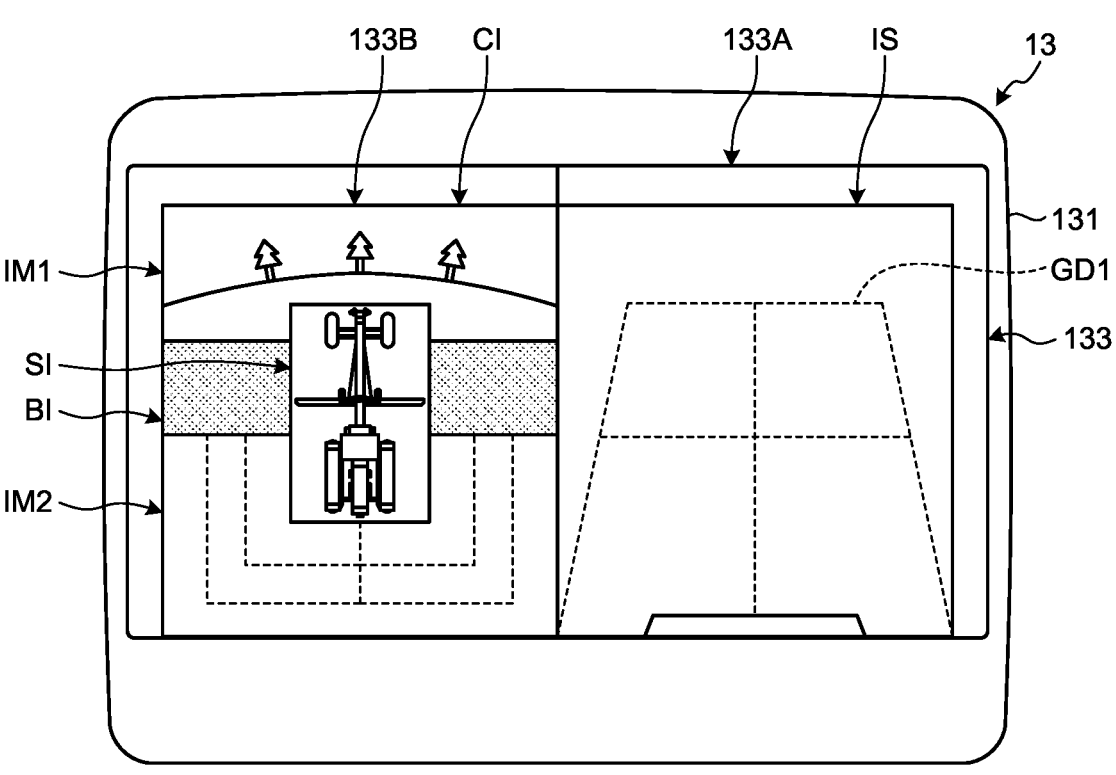
FIG. 6 is a diagram illustrating a surroundings monitoring monitor according to the embodiment.
Figure 6:
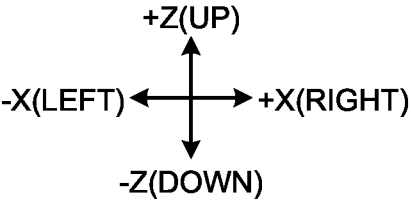

FIG. 6 is a diagram illustrating the surroundings monitoring monitor 13 according to the embodiment. The surroundings monitoring monitor 13 displays the surroundings of the motor grader 1. The surroundings monitoring monitor 13 displays at least the surroundings of the vehicle body 2. As illustrated in FIG. 6, the surroundings monitoring monitor 16 includes a display unit 131.

The display control unit 147 displays a single camera image IS in a first area 133A of a display screen 133 of the display unit 131. The display control unit 147 displays a composite image CI in a second area 133B of a display screen 133 of the display unit 131. In the embodiment, the second area 133B is defined on the left side of the first area 133A.

The single camera image IS refers to a camera image of a part of the surroundings of the motor grader 1 acquired by at least one camera of the plurality of cameras of the camera system 11. The single camera image IS includes at least one of the first camera image indicating a situation in the left front of the motor grader 1 acquired by the first camera 111, the second camera image indicating a situation in the right front of the motor grader 1 acquired by the second camera 112, the third camera image indicating a situation in the left of the motor grader 1 acquired by the third camera 113, the fourth camera image indicating a situation in the right of the motor grader 1 acquired by the fourth camera 114, and the fifth camera image indicating a situation in the rear of the motor grader 1 acquired by the fifth camera 115.

In the example illustrated in FIG. 6, the single camera image IS displayed in the first area 133A is the fifth camera image indicating the situation in the rear of the motor grader 1 acquired by the fifth camera 115.

Along with the single camera image IS, a reference line GD1 is displayed in the first area 133A. The reference line GD1 indicates a reference of a distance from the vehicle body 2. In the embodiment, the reference line GD1 indicates the distance from the outer edge of the vehicle body 2.

Figure 7:
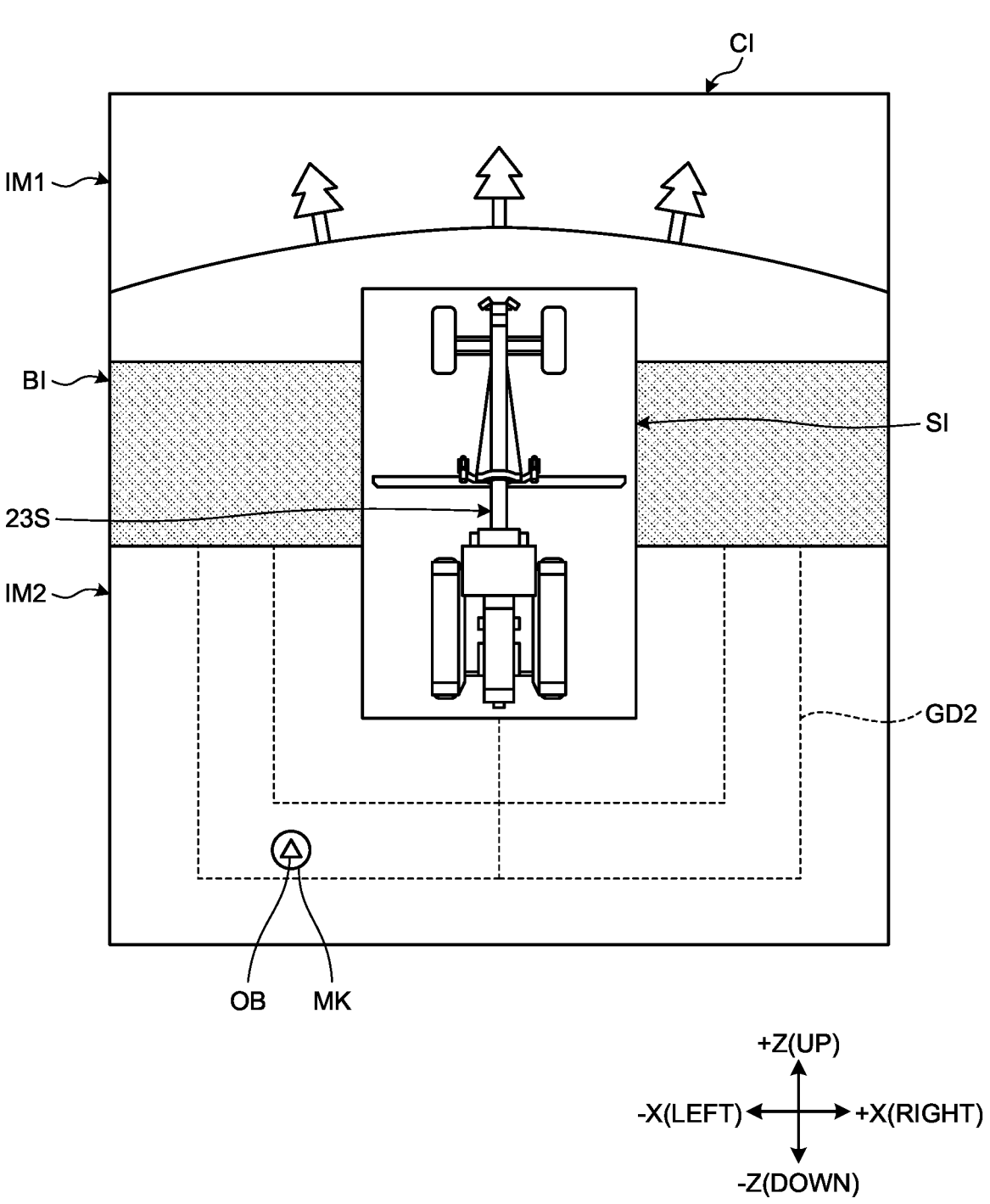
FIG. 7 is a diagram illustrating a composite image according to the embodiment.

FIG. 7 is a diagram illustrating the composite image CI according to the embodiment. As illustrated in FIGS. 6 and 7, the composite image CI includes the panoramic image IM1, the bird's eye image IM2, the boundary image BI, and the symbol image SI.

The display control unit 147 displays the panoramic image IM1 as a part of the composite image CI on the display screen 133. The display control unit 147 displays the bird's eye image IM2 as a part of the composite image CI on the display screen 133. The display control unit 147 displays the boundary image BI at the boundary between the panoramic image IM1 and the second display image IM2 on the display screen 133.

The display control unit 147 displays the symbol image SI in the center area of the composite image CI on the display screen 133. The display control unit 147 displays the panoramic image IM1, the bird's eye image IM2, and the boundary image BI around the symbol image SI.

The panoramic image IM1 is disposed on the upper portion of the composite image CI. The bird's eye image IM2 is disposed on the lower portion of the composite image CI. The boundary image BI is displayed on a side portion of the symbol image SI.

In the embodiment, the boundary image BI is displayed on the side portion of an articulate mechanism 23S of the symbol image SI. The boundary image BI is disposed so as to extend in the left-right direction in the composite image CI. The boundary image BI is displayed in a band shape on each of the left side and the right side of the symbol image SI.

Note that the boundary image BI may be displayed between the front wheels of the symbol image SI and the cab on the display screen 133. The boundary image BI may be displayed in a predetermined area below the panoramic image IM1 displayed in the composite image CI on the display screen 133. The boundary image BI may be displayed in a predetermined area above the bird's eye image IM2 displayed in the composite image CI on the display screen 133. The boundary image BI may be displayed in a predetermined area of the composite image CI on the display screen 133. Note that the predetermined area may be determined by an image coordinate system with an upper left pixel of the composite image CI as an origin.

As described above, the non-detection range NR2 in which an image is not captured by the camera system 11 is generated in a part of the surroundings of the cab 3. For the non-detection range NR2, the panoramic image IM1 and the bird's eye image IM2 are not generated. That is, an area corresponding to the non-detection range NR2 on the display screen 133 is a non-display area where the panoramic image IM1 and the bird's eye image IM2 are not displayed. The boundary image BI is generated so as to cover the non-display area where the panoramic image IM1 and the bird's eye image IM2 are not displayed on the display screen 133.

The symbol image SI clarifies the positional relationship between the motor grader 1 and the surroundings of the motor grader 1.

Along with the composite image CI, a reference line GD2 is displayed in the second area 133B. Similarly to the reference line GD1, the reference line GD2 indicates a reference of the distance from the vehicle body 2. In the embodiment, the reference line GD2 is displayed so as to be superimposed on the bird's eye image IM2. The reference line GD2 is disposed around the symbol image SI in the bird's eye image IM2. Note that the reference line GD2 may not be disposed.

When an obstacle OB is detected by the radar system 12, the display control unit 147 may display a marker MK on the display screen 133 so as to overlap the obstacle OB projected on the bird's eye image IM2. The marker MK functions as a symbol image that emphasizes the obstacle OB on the display screen 133.

An operation unit (not illustrated) of the surroundings monitoring monitor 13 includes a plurality of switches disposed in the cab 3. Specific functions are assigned to the plurality of switches. When the switch is operated by the driver, an operation signal for the specific function is generated.

Figure 8:
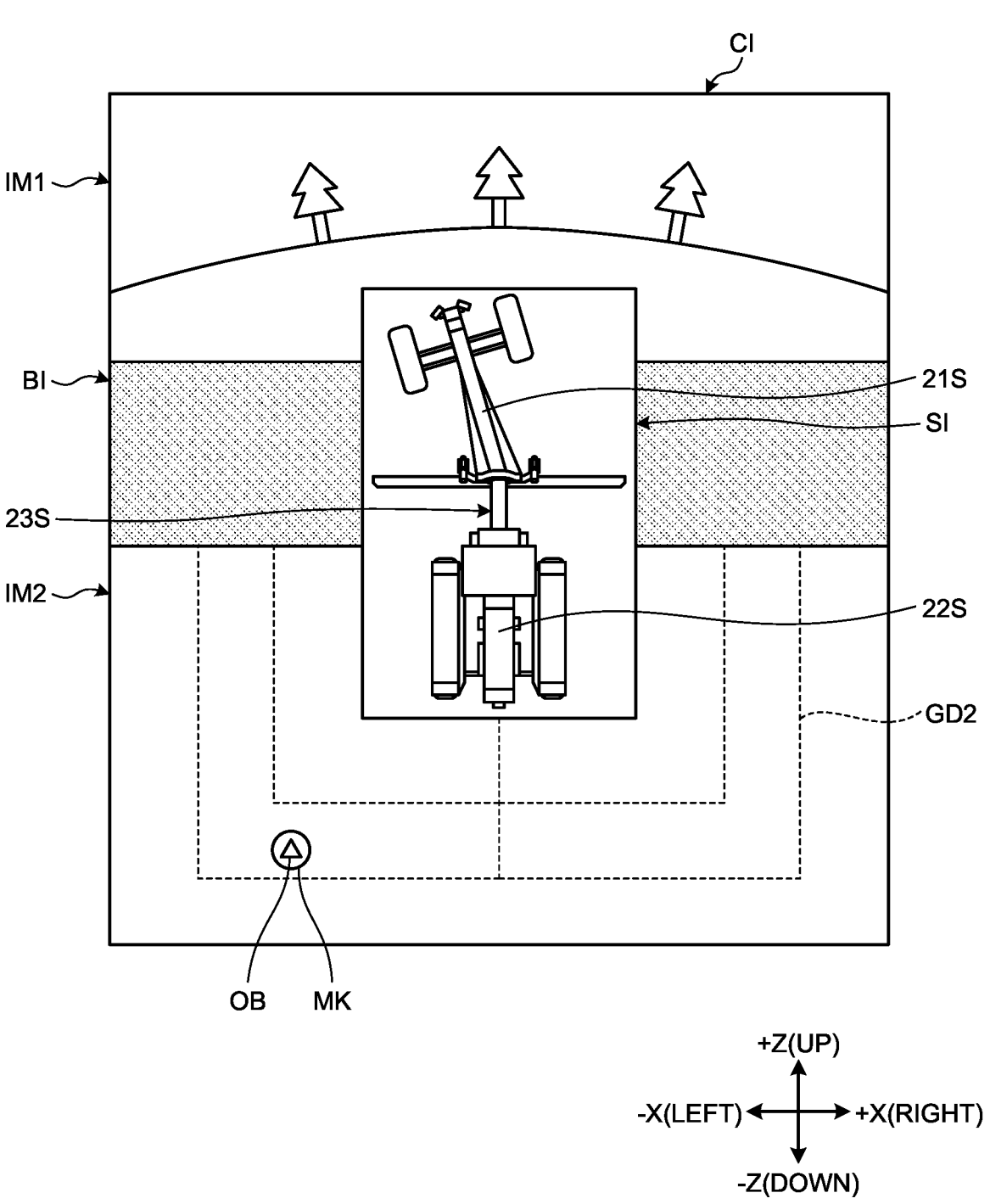
FIG. 8 is a diagram illustrating the composite image according to the embodiment.

FIG. 8 is a diagram illustrating the composite image CI according to the embodiment. In the embodiment, the symbol image generation unit 145 changes the symbol image SI on the basis of the operation signal from the travel operation device 7. As illustrated in FIG. 8, when the front vehicle body 21 is bent with respect to the rear vehicle body 22 by the operation of the travel operation device 7, the symbol image generation unit 145 generates the symbol image SI based on the operation signal from the travel operation device 7 such that a front vehicle body 21S is bent with respect to a rear vehicle body 22S also in the symbol image SI.

<Composite Image Generating Method>

Figure 9:
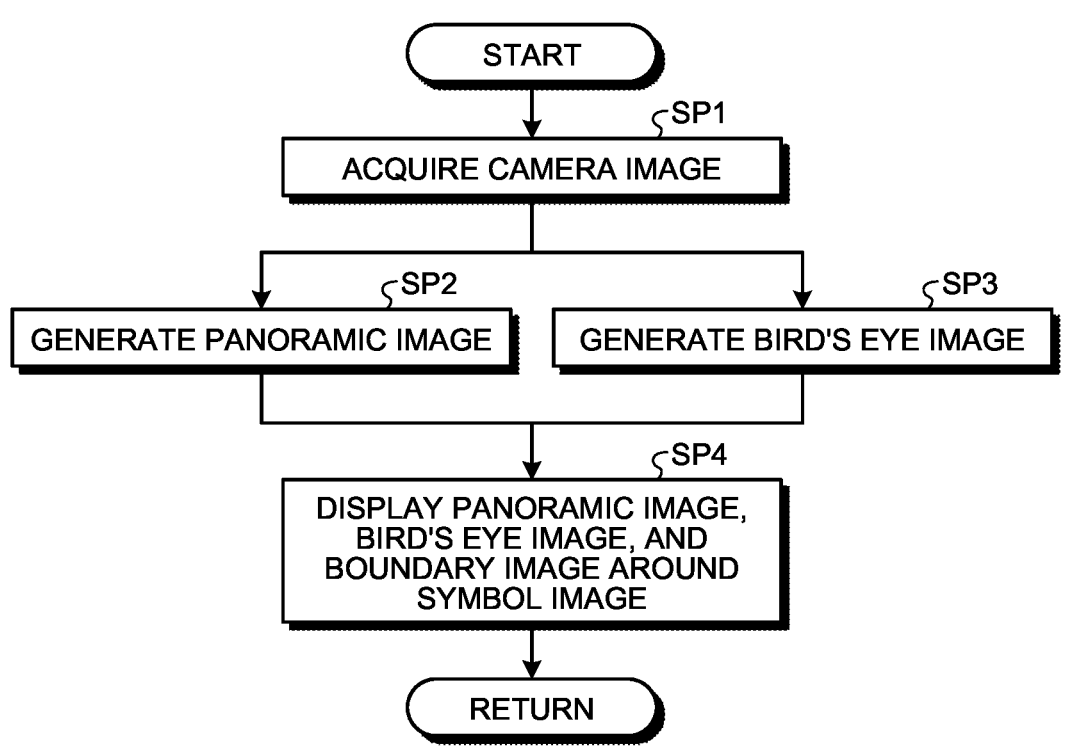
FIG. 9 is a flowchart illustrating a composite image generating method according to the embodiment.

FIG. 9 is a flowchart illustrating a composite image generating method according to the embodiment. When the motor grader 1 is keyed on, the surroundings monitoring system 10 is activated.

The camera of the camera system 11 captures the image of the surroundings of the motor grader 1. The camera image acquisition unit 141 acquires the camera image from the camera (step SP1).

The first display image generation unit 142 generates the panoramic image IM1 indicating the front portion around the motor grader 1 based on the first camera image around the motor grader 1 captured by the first camera 111 and the second camera image around the motor grader 1 captured by the second camera 112 (step SP2).

The second display image generation unit 143 generates the bird's eye image IM2 indicating the rear portion around the motor grader 1 based on the third camera image around the motor grader 1 captured by the third camera 113, the fourth camera image around the motor grader 1 captured by the fourth camera 114, and the fifth camera image around the motor grader 1 captured by the fifth camera 115 (step SP3).

The boundary image generation unit 144 generates the boundary image BI. The symbol image generation unit 145 generates the symbol image SI on the basis of the operation signal of the travel operation device 7.

The display control unit 147 displays the symbol image SI on the display screen 133 of the display unit 131. In addition, the display control unit 147 displays the panoramic image IM1, the bird's eye image IM2, and the boundary image BI around the symbol image SI (step SP4).

<Computer System>

Figure 10:
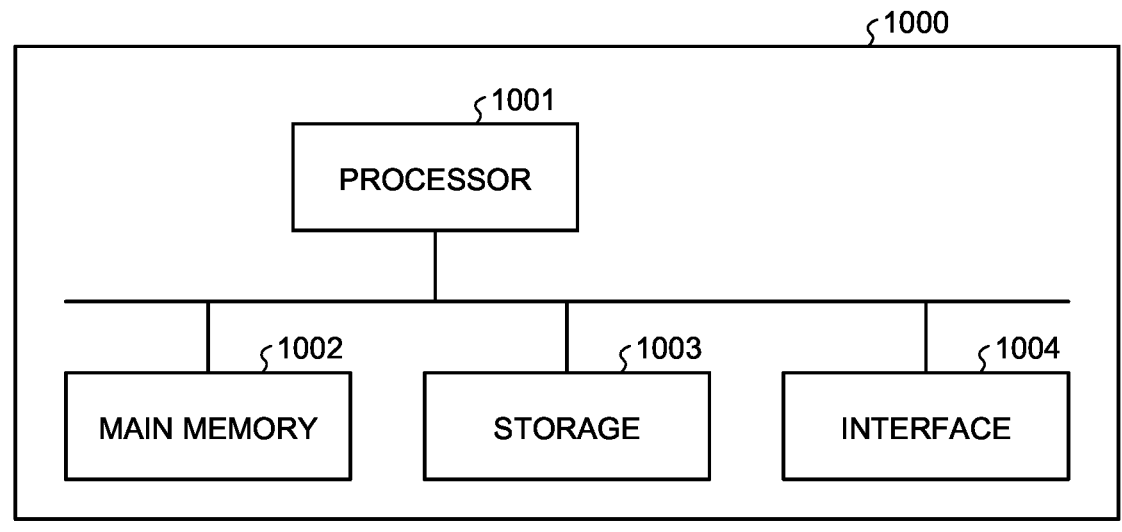
FIG. 10 is a block diagram illustrating a computer system according to the embodiment.

FIG. 10 is a block diagram illustrating a computer system 1000 according to the embodiment. Each of the monitor control device 14, the working equipment control device 8, and the travel control device 9 described above includes the computer system 1000. The computer system 1000 includes a processor 1001 such as a central processing unit (CPU), a main memory 1002 including a nonvolatile memory such as a read only memory (ROM) and a volatile memory such as a random access memory (RAM), a storage 1003, and an interface 1004 including an input/output circuit. For example, the function of the monitor control device 14 is stored in the storage 1003 as a computer program. The processor 1001 reads the computer program from the storage 1003, loads the computer program in the main memory 1002, and executes the above-described processing according to the computer program. Note that the computer program may be distributed to the computer system 1000 via a network.

According to the above-described embodiment, the computer program or the computer system 1000 can execute: generating the first display image IM1 indicating the surroundings of the motor grader 1 on the basis of the camera image of the camera that captures the image of the surroundings of the motor grader 1; generating the second display image IM2 in the display mode different from that of the first display image IM1 on the basis of the camera images of the plurality of cameras that capture the images of the surroundings of the motor grader 1; and generating a signal for displaying the first display image IM1 on a part of the display screen 133, displaying the second display image IM2 on a part of the display screen 133, and displaying the boundary image BI at the boundary between the first display image IM1 and the second display image IM2 on the display screen 133.

<Effects>

As described above, according to the embodiment, when the panoramic image IM1 is displayed in a partial area of the display screen 133 and the bird's eye image IM2 is displayed in another partial area of the display screen 133, the boundary image BI is displayed at the boundary between the panoramic image IM1 and the bird's eye image IM2. Since the boundary image BI makes the boundary between the panoramic image IM1 and the bird's eye image IM2 clear, deterioration in visibility of each of the panoramic image IM1 and the bird's eye image IM2 is suppressed.

The panoramic image IM1 is a first viewpoint image viewed from a reference viewpoint different from the position of the first camera 111 and the position of the second camera 112. The bird's eye image IM2 is a second viewpoint image viewed from an upper viewpoint different from the position of the third camera 113, the position of the fourth camera 114, and the position of the fifth camera 115. When the panoramic image IM1 and the bird's eye image IM2 in a display mode different from that of the panoramic image IM1 are displayed in parallel, it may be difficult for the driver to visually recognize each of the panoramic image IM1 and the bird's eye image IM2. According to the embodiment, since the boundary image BI makes the boundary between the panoramic image IM1 and the bird's eye image IM2 clear, deterioration in visibility of each of the panoramic image IM1 and the bird's eye image IM2 is suppressed.

The symbol image SI indicating the motor grader 1 is displayed on the display screen 133. Each of the panoramic image IM1, the bird's eye image IM2, and the boundary image BI is displayed around the symbol image SI. As a result, the driver can recognize the relative position between the motor grader 1, the first portion around the motor grader 1 indicated by the panoramic image IM1, the second portion around the motor grader 1 indicated by the bird's eye image IM2, and the boundary image BI.

The first portion around the motor grader 1 indicated by the panoramic image IM1 indicates the front portion around the motor grader 1. The second portion around the motor grader 1 indicated by the bird's eye image IM2 indicates the rear portion around the motor grader 1. Since the boundary image BI is displayed on the side portion of the symbol image SI, the driver can recognize the relative position between the front portion around the motor grader 1 and the rear portion around the motor grader 1, and can clearly recognize the boundary between the panoramic image IM1 and the bird's eye image IM2.

The motor grader 1 includes the front vehicle body 21, the rear vehicle body 22, and the articulate mechanism 23 that connects the front vehicle body 21 and the rear vehicle body 22. Each of the first camera 111 and the second camera 112 is provided in the front vehicle body 21. Each of the third camera 113, the fourth camera 114, and the fifth camera 115 is provided in the rear vehicle body 22. As a result, the surroundings monitoring system 10 can monitor the surroundings of each of the front vehicle body 21 and the rear vehicle body 22.

The first portion around the motor grader 1 indicated by the panoramic image IM1 indicates the surroundings of the front vehicle body 21. As a result, for example, when the motor grader 1 enters an intersection with poor visibility, the driver can appropriately recognize the situation of the intersection and the traveling path configuring the intersection based on the panoramic image IM1.

The second portion around the motor grader 1 indicated by the bird's eye image IM2 indicates the surroundings of the rear vehicle body 22. As a result, the driver can appropriately recognize the situation of the obstacle around the rear vehicle body 22 based on the bird's eye image IM2.

The boundary image BI is displayed on the side portion of the articulate mechanism 23S of the symbol image SI. As a result, the driver can recognize the relative position between the surroundings of the front vehicle body 21 and the surroundings of the rear vehicle body 22, and can clearly recognize the boundary between the panoramic image IM1 and the bird's eye image IM2.

The boundary image BI is generated so as to cover the non-display area where the panoramic image IM1 and the bird's eye image IM2 are not displayed on the display screen 133. Since the non-display area corresponding to the non-imaging range NR1 from which the camera image cannot be obtained is covered with the boundary image BI, the driver can clearly recognize the boundary between the panoramic image IM1 and the bird's eye image IM2.

Second Embodiment

The surroundings monitoring system 10 according to the first embodiment generates the boundary image BI so as to cover the non-display area corresponding to the non-imaging range NR1. On the other hand, the surroundings monitoring system 10 according to the second embodiment displays the boundary image BI at the boundary between the panoramic image IM1 and the bird's eye image IM2 when the non-imaging range NR1 does not occur.

As in the first embodiment, the surroundings monitoring system 10 according to the second embodiment includes the first camera 111 that acquires the first camera image for generating the first display image IM1 and the second camera 112 that acquires the second camera image. The surroundings monitoring system 10 according to the second embodiment includes a plurality of cameras that capture images in other imaging ranges around the motor grader 1 different from the imaging range M1 of the first camera 111 and the imaging range M2 of the second camera 112. That is, the plurality of cameras are disposed so that an image of a portion different from a portion around the motor grader 1 indicated by the panoramic image IM1 can be captured. Note that the plurality of cameras may be disposed so as to be able to capture images of 360° of the entire surroundings of the motor grader 1.

The second display image generation unit 143 according to the second embodiment uses camera images of the plurality of cameras to generate a bird's eye image indicating the portion different from the portion around the motor grader 1 indicated by the panoramic image IM1.

The display control unit 147 according to the second embodiment displays the symbol image SI on the display screen 133 of the display unit 131. In addition, the display control unit 147 displays the panoramic image IM1, the bird's eye image IM2, and the boundary image BI around the symbol image SI. The panoramic image IM1 is disposed on the upper portion of the composite image CI. The bird's eye image IM2 is disposed below the panoramic image IM1. The boundary image BI is displayed on the side portion of the symbol image SI so as to cover a part of the bird's eye image IM2. Note that the boundary image BI may be disposed so as to cover a part of the panoramic image IM1 or may be disposed so as to cover the part of the panoramic image IM1 and the part of the bird's eye image IM2.

<Effects>

The surroundings monitoring system 10 according to the second embodiment can clearly recognize the boundary between the panoramic image IM1 and the bird's eye image IM2 when the non-imaging range NR1 does not occur by displaying the boundary image BI so as to cover the part of the bird's eye image IM2.

Other Embodiments

Figure 11:
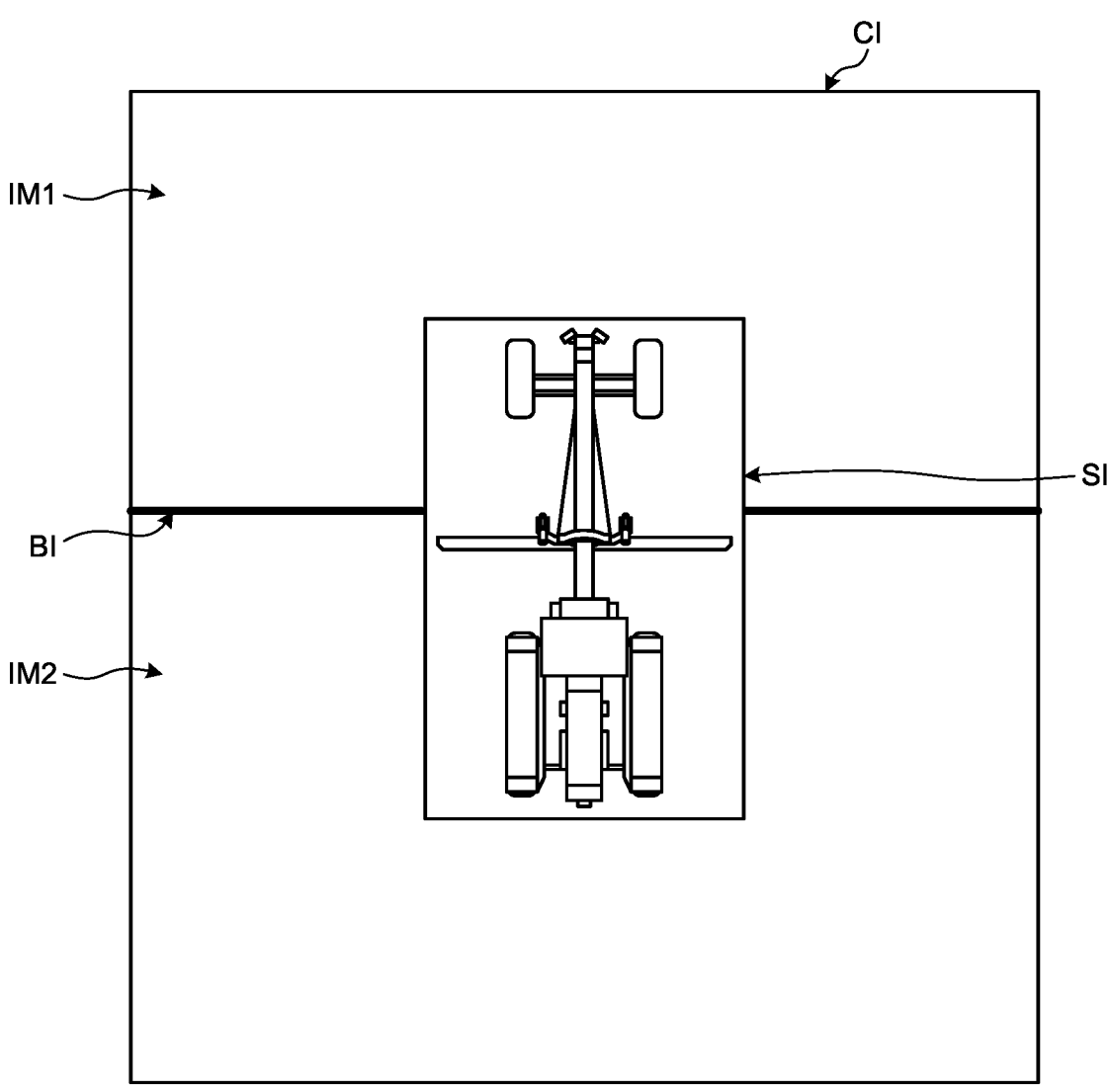
FIG. 11 is a diagram illustrating a composite image according to an embodiment.

FIG. 11 is a diagram illustrating a composite image CI according to an embodiment. In the above-described embodiment, the boundary image BI has a band shape. As illustrated in FIG. 11, the boundary image BI may be linear. Further, the boundary image BI may be an image painted in a predetermined color such as black.

Figure 12:
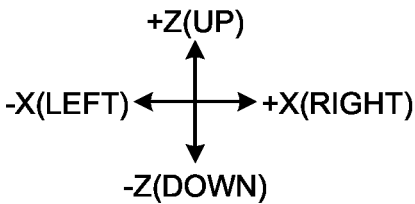
FIG. 12 is a diagram illustrating a composite image according to an embodiment.

FIG. 12 is a diagram illustrating a composite image CI according to an embodiment. As illustrated in FIG. 12, the panoramic image IM1 may be surrounded by a frame image FI1. The frame image FI1 is displayed along the peripheral edge of the panoramic image IM1. A part of the frame image FI1 may function as the boundary image BI.

Figure 13:
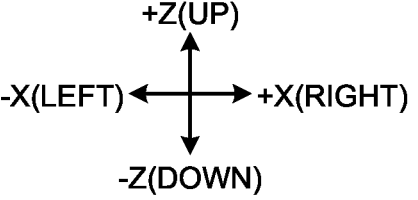
FIG. 13 is a diagram illustrating a composite image according to an embodiment.

FIG. 13 is a diagram illustrating a composite image CI according to an embodiment. As illustrated in FIG. 13, the panoramic image IM1 may be surrounded by the frame image FI1, and the bird's eye image IM2 may be surrounded by a frame image FI2. The frame image FI2 is displayed along the peripheral edge of the bird's eye image IM2. The color of the frame image FI1 is different from the color of the frame image FI2. A part of the frame image FI1 and a part of the frame image FI2 may function as the boundary image BI.

In the above-described embodiment, the boundary image BI may have a curved shape, a triangular shape, or a polygonal shape such as a pentagon.

In the above-described embodiment, the part of the bird's eye image IM2 displayed on the side of the symbol image SI may function as the boundary image BI. The part of the bird's eye image IM2 displayed on the side of the symbol image SI may be translucently displayed, and the translucent display portion may function as the boundary image BI.

In the above-described embodiment, the boundary image generation unit 144 generates the boundary image BI. In another embodiment, the boundary image generation unit 144 may not generate the boundary image BI. For example, the boundary image BI may be stored in advance in the display control unit 147, and the display control unit 147 may display the boundary image BI stored in advance.

In the above-described embodiment, the surroundings monitoring system 10 may not include the surroundings monitoring monitor 13 and the radar system 12. For example, the surroundings monitoring system 10 may output a signal to be displayed on the monitor. In addition, an obstacle may be detected by performing image analysis on the camera image of the camera system 11 instead of the radar system 12. Also, the obstacle may not be detected. In addition, some components of the surroundings monitoring system 10 may be mounted inside the motor grader 1, and other components may be provided outside the motor grader 1. For example, the surroundings monitoring monitor 13 of the surroundings monitoring system 10 may be disposed in a remote operation room provided at a remote place of the motor grader 1.

In the above-described embodiment, the display control unit 147 may generate a signal for displaying the panoramic image IM1, the bird's eye image IM2, the boundary image BI, and the symbol image SI on the display screen 133.

In the above-described embodiment, the first camera 111 and the second camera 112 are provided in the front vehicle body 21. The number of cameras provided in the front vehicle body 21 may be any number of three or more.

In the above-described embodiment, the installation positions of the camera (111, 112, 113, 114, and 115) and the radar (121, 122, 123, 124, and 125) are not limited to the installation positions described in the above-described embodiments, and may be any installation positions.

In the above-described embodiment, the imaging range M1 and the imaging range M2 may not overlap. The imaging range M3 and the imaging range M5 may not overlap. The imaging range M4 and the imaging range M5 may not overlap.

In the above-described embodiment, the third camera 113, the fourth camera 114, and the fifth camera 115 are provided in the rear vehicle body 22. The number of cameras provided in the front vehicle body 21 may be two, or any number of four or more.

In the above-described embodiment, the camera system 11 may include one camera having a wide viewing angle.

In the above-described embodiment, the first display image IM1 may be the bird's eye image, and the second display image IM2 may be the panoramic image. Both the first display image IM1 and the second display image IM2 may be the panoramic images. Both the first display image IM1 and the second display image IM2 may be the bird's eye images.

In the above-described embodiment, one or both of the first display image IM1 and the second display image IM2 may be a single camera image.

In the above-described embodiment, the work machine 1 may be an articulate dump truck having an articulate mechanism. Further, the work machine 1 may be a wheel loader having an articulate mechanism and working equipment. In addition, the work machine 1 may be an excavator or a bulldozer having no articulate mechanism, or may be a rigid dump truck.

REFERENCE SIGNS LIST

1 MOTOR GRADER (WORK MACHINE)
2 VEHICLE BODY
3 CAB
4 WORKING EQUIPMENT
5 WHEEL
6 WORKING EQUIPMENT OPERATION DEVICE
7 TRAVEL OPERATION DEVICE
8 WORKING EQUIPMENT CONTROL DEVICE
9 TRAVEL CONTROL DEVICE
10 SURROUNDINGS MONITORING SYSTEM
11 CAMERA SYSTEM
12 RADAR SYSTEM
13 SURROUNDINGS MONITORING MONITOR
14 MONITOR CONTROL DEVICE
21 FRONT VEHICLE BODY
22 REAR VEHICLE BODY
23 ARTICULATE MECHANISM
24 ARTICULATE CYLINDER
25 EXTERIOR COVER
26 ENGINE
31 SEAT
40 DRAWBAR
41 SWING CIRCLE
42 BLADE
44 LIFT CYLINDER
45 LIFT CYLINDER
51 FRONT WHEEL
52 REAR WHEEL
111 FIRST CAMERA
112 SECOND CAMERA
113 THIRD CAMERA
114 FOURTH CAMERA
115 FIFTH CAMERA
121 FIRST RADAR
122 SECOND RADAR
123 THIRD RADAR
124 FOURTH RADAR
125 FIFTH RADAR
131 DISPLAY UNIT
133 DISPLAY SCREEN
141 CAMERA IMAGE ACQUISITION UNIT
142 FIRST DISPLAY IMAGE GENERATION UNIT
143 SECOND DISPLAY IMAGE GENERATION UNIT
144 BOUNDARY IMAGE GENERATION UNIT
145 SYMBOL IMAGE GENERATION UNIT
146 DETECTION DATA ACQUISITION UNIT
147 DISPLAY CONTROL UNIT

BI BOUNDARY IMAGE
CI COMPOSITE IMAGE
D1 DETECTION RANGE
D2 DETECTION RANGE
D3 DETECTION RANGE
D4 DETECTION RANGE
D5 DETECTION RANGE
FI1 FRAME IMAGE
FT2 FRAME IMAGE
GD1 REFERENCE LINE
GD2 REFERENCE LINE
IM1 FIRST DISPLAY IMAGE (PANORAMIC IMAGE)
IM2 SECOND DISPLAY IMAGE (BIRD'S EYE IMAGE)
IS SINGLE CAMERA IMAGE
M1 IMAGING RANGE
M2 IMAGING RANGE
M3 IMAGING RANGE
M4 IMAGING RANGE
M5 IMAGING RANGE
NR1 NON-IMAGING RANGE
NR2 NON-DETECTION RANGE
SI SYMBOL IMAGE

The invention claimed is:

1. A surroundings monitoring system for a work machine comprising:
a monitor;
a plurality of cameras for capturing images of surroundings of the work machine; and
a processor,
wherein the processor is configured to:
acquire camera images from the plurality of cameras;
generate a first display image including a front portion around the work machine on the basis of the camera images;
generate a second display image including a rear portion around the work machine, which is different from that of the first display image, on the basis of the camera images; and
display a symbol image indicating the work machine on the monitor, display the first display image and the second display image around the symbol image, and generate a signal for displaying a boundary image disposed between the first display image and the second display image.

2. The work machine surroundings monitoring system according to claim 1, wherein
the display mode different from that of the first display image is an image viewed from a viewpoint different from that of the first display image.

3. The work machine surroundings monitoring system according to claim 1, wherein
the first display image is a panoramic image, and the second display image is a bird's eye image.

4. The work machine surroundings monitoring system according to claim 1, wherein
the camera includes a first camera that acquires a first camera image and a second camera that acquires a second camera image, for generating the first display image, and a third camera that acquires a third camera image and a fourth camera that acquires a fourth camera image, for generating the second display image,
the work machine includes a front vehicle body, a rear vehicle body, and an articulate mechanism that connects the front vehicle body and the rear vehicle body,
the first camera and the second camera are provided in the front vehicle body, and the third camera and the fourth camera are provided in the rear vehicle body.

5. The work machine surroundings monitoring system according to claim 4, wherein the first display image includes surroundings of the front vehicle body, the second display image includes surroundings of the rear vehicle body, and the boundary image is displayed on a side portion of the articulate mechanism of the symbol image.

6. The work machine surroundings monitoring system according to claim 4, wherein the first display image is a first viewpoint image viewed from a first viewpoint different from a position of the first camera and a position of the second camera, and the second display image is a second viewpoint image viewed from a second viewpoint different from a position of the third camera and a position of the fourth camera.

7. The work machine surroundings monitoring system according to claim 1, wherein the boundary image is generated so as to cover a non-display area where the first display image and the second display image are not displayed on the display screen.

8. A work machine comprising:

working equipment that performs work at a work site;

a vehicle body that supports the working equipment;

a plurality of cameras for capturing images of surroundings of the vehicle body;

a monitor that displays an image captured by the camera; and a processor wherein the processor is configured to:

acquire camera images from the plurality of cameras;

generate a first display image including a front portion around the vehicle body on the basis of the camera images;

generate a second display image including a rear portion around the vehicle body, which is different from that of the first display image, on the basis of the camera images; and display a symbol image indicating the work machine on the monitor, display the first display image and the second display image around the symbol image, and display a boundary image disposed between the first display image and the second display image.

9. The work machine according to claim 8, further comprising:

a front wheel and a rear wheel that support the vehicle body, wherein the vehicle body includes a front vehicle body and a rear vehicle body, the working equipment includes a blade disposed between the front wheel and the rear wheel, and the front wheel is disposed in front of the blade, and the rear wheel is disposed behind the blade.

10. The work machine according to claim 9, wherein at least one of the plurality of cameras is provided in the front vehicle body and captures an image of a front of the front vehicle body, and at least one of the plurality of cameras is provided in the rear vehicle body and captures an image of a rear of the rear vehicle body.

11. The work machine according to claim 10, wherein the camera includes a first camera and a second camera that are provided in the front vehicle body and capture images of front of the front vehicle body, and a third camera and a fourth camera that are provided in the rear vehicle body and capture images of rear of the rear vehicle body, and the processor generates the first display image on the basis of camera images captured by the first camera and the second camera, and generates the second display image on the basis of camera images captured by the third camera and the fourth camera.

12. A work machine surroundings monitoring method comprising:

acquiring camera images from the plurality of cameras for capturing images surroundings of the work machine;

generating a first display image including a front portion around the work machine on the basis of the camera images;

generating a second display image including a rear portion around the work machine, which is different from that of the first display image, on the basis of the camera images; and displaying a symbol image indicating the work machine on the display screen, displaying the first display image and the second display image around the symbol image, and generating a signal for displaying a boundary image disposed between the first display image and the second display image.

13. The work machine surroundings monitoring method according to claim 12, wherein a display mode different from that of the first display image is an image viewed from a viewpoint different from that of the first display image.

14. The work machine surroundings monitoring method according to claim 12, wherein the first display image is a panoramic image, and the second display image is a bird's eye image.

15. The work machine surroundings monitoring method according to claim 12, wherein the camera includes a first camera that acquires a first camera image and a second camera that acquires a second camera image, for generating the first display image, and a third camera that acquires a third camera image and a fourth camera that acquires a fourth camera image, for generating the second display image, the work machine includes a front vehicle body, a rear vehicle body, and an articulate mechanism that connects the front vehicle body and the rear vehicle body, the first camera and the second camera are provided in the front vehicle body, and the third camera and the fourth camera are provided in the rear vehicle body.

16. The work machine surroundings monitoring method according to claim 15, wherein the first display image includes surroundings of the front vehicle body, the second display image includes surroundings of the rear vehicle body, and the boundary image is displayed on a side portion of the articulate mechanism of the symbol image.

17. The work machine surroundings monitoring method according to claim 12, wherein the boundary image is generated so as to cover a non-display area where the first display image and the second display image are not displayed on the display screen.

* * * * *